US009568669B2

(12) United States Patent
Jiang et al.

(10) Patent No.: US 9,568,669 B2
(45) Date of Patent: *Feb. 14, 2017

(54) BANDWIDTH-MAINTAINING MULTIMODE OPTICAL FIBERS

(75) Inventors: Xinli Jiang, Shrewsbury, MA (US); Durgesh S. Vaidya, Southbridge, MA (US); George E. Oulundsen, Belchertown, MA (US)

(73) Assignee: OFS FITEL, LLC, Norcross, GA (US)

( * ) Notice: Subject to any disclaimer, the term of this patent is extended or adjusted under 35 U.S.C. 154(b) by 934 days.

This patent is subject to a terminal disclaimer.

(21) Appl. No.: 13/252,964

(22) Filed: Oct. 4, 2011

(65) Prior Publication Data
US 2012/0183267 A1     Jul. 19, 2012

Related U.S. Application Data

(63) Continuation-in-part of application No. 12/583,212, filed on Aug. 17, 2009, now Pat. No. 8,520,994.

(60) Provisional application No. 61/389,701, filed on Oct. 4, 2010, provisional application No. 61/097,639, filed on Sep. 17, 2008.

(51) Int. Cl.
*G02B 6/02* (2006.01)
*G02B 6/028* (2006.01)
*G02B 6/036* (2006.01)
*G02B 6/14* (2006.01)

(52) U.S. Cl.
CPC ......... *G02B 6/02023* (2013.01); *G02B 6/0288* (2013.01); *G02B 6/0365* (2013.01); *G02B 6/14* (2013.01)

(58) Field of Classification Search
CPC ................................................... G02B 6/0365
See application file for complete search history.

(56) References Cited

U.S. PATENT DOCUMENTS

| | | | | |
|---|---|---|---|---|
| 7,646,955 B2* | 1/2010 | Donlagic | ....................... | 385/124 |
| 7,903,918 B1* | 3/2011 | Bickham et al. | ............. | 385/124 |
| 2009/0154888 A1* | 6/2009 | Abbott et al. | ................ | 385/124 |
| 2009/0169163 A1* | 7/2009 | Abbott et al. | ................ | 385/127 |

* cited by examiner

*Primary Examiner* — John M Bedtelyon

(57) ABSTRACT

The specification describes multimode optical fibers with specific design parameters, i.e., controlled refractive index design ratios and dimensions, which render the optical fibers largely immune to moderately severe bends. The modal structure in the optical fibers is also largely unaffected by bending, thus leaving the optical fiber bandwidth essentially unimpaired. Bend performance results were established by DMD measurements of fibers wound on mandrels vs. measurements of fibers with no severe bends. Additional embodiments of the present invention describe an improved optical link when the inventive multimode fiber is connected to standard or conventional multimode fibers.

19 Claims, 14 Drawing Sheets

BANDWIDTH-MAINTAINING MULTIMODE OPTICAL FIBERS

RELATED APPLICATIONS

This application is a continuation-in-part of U.S. application Ser. No. 12/583,212, filed Aug. 17, 2009, which claims priority from U.S. Provisional Application No. 61/097,639, filed Sep. 17, 2008, both of which are incorporated herein in their entirety. This application also claims priority from U.S. Provisional Application No. 61/389,701 filed Oct. 4, 2010, which is incorporated herein in its entirety.

FIELD OF THE INVENTION

This invention relates to a family of designs for optical fibers having robust optical transmission characteristics. More specifically it relates to optical fibers designed to control bend loss while maintaining the modal structure and bandwidth of the fibers.

BACKGROUND OF THE INVENTION

The tendency of optical fibers to leak optical energy when bent has been known since the infancy of the technology. It is well known that light follows a straight path but can be guided to some extent by providing a path, even a curved path, of high refractive index material surrounded by material of lower refractive index. However, in practice that principle is limited, and optical fibers often have bends with a curvature that exceeds the ability of the light guide to contain the light.

Controlling transmission characteristics when bent is an issue in nearly every practical optical fiber design. The initial approach, and still a common approach, is to prevent or minimize physical bends in the optical fiber. While this can be largely achieved in long hauls by designing a robust cable, or in shorter hauls by installing the optical fibers in microducts, in all cases the optical fiber must be terminated at each end. Thus even under the most favorable conditions, bending, often severe bending, is encountered at the optical fiber terminals.

Controlling bend loss can also be addressed by the physical design of the optical fiber itself. Some optical fibers are inherently more immune to bend loss than others. This was recognized early, and most optical fibers are now specifically designed for low loss. The design features that are typically effective for microbend loss control involve the properties of the optical fiber cladding, usually the outer cladding. Thus ring features or trench features, or combinations thereof, are commonly found at the outside of the optical fiber refractive index profiles to control bend losses. See for example, U.S. Pat. Nos. 4,691,990 and 4,852,968, both incorporated herein by reference.

Performance issues for optical fibers under bend conditions have generally been considered to involve generalized optical power loss, due to leakage of light from the optical fiber at the location of the bend. In most cases, the influence of modal structure changes on bend loss is overlooked.

In single mode optical fibers general power loss is the primary consideration, because all leakage involves light in the fundamental mode of the optical fiber. However, in multimode optical fiber the modal structure affects the loss, with higher order modes suffering more loss than lower order modes. In addition, bends in the optical fiber cause modes to transform and mix. Accordingly, while a signal in a lower order mode may survive some bending, if it is converted to a higher order mode it will be more susceptible to bending loss.

The combination of higher order and lower order modes in a multimode optical fiber determines the bandwidth, and thus the signal carrying capacity, of the optical fiber. Bending multimode optical fiber may reduce the signal carrying capacity of the optical system.

The property of differential mode loss in multimode optical fibers can be more serious than generalized optical loss in single mode optical fibers. The latter can be addressed using low cost power amplifiers. However, differential mode loss in multimode optical fibers can lead to complete loss of signals propagating in higher order modes.

STATEMENT OF THE INVENTION

We have designed multimode optical fibers that largely preserve the modal structure, and thus the bandwidth, of the optical fiber even in the presence of severe bending. Additional embodiments of the present invention describe an improved optical link with improved connectivity and interoperability when the inventive multimode fiber is connected to standard or conventional multimode fibers.

DETAILED DESCRIPTION

Figure 1:
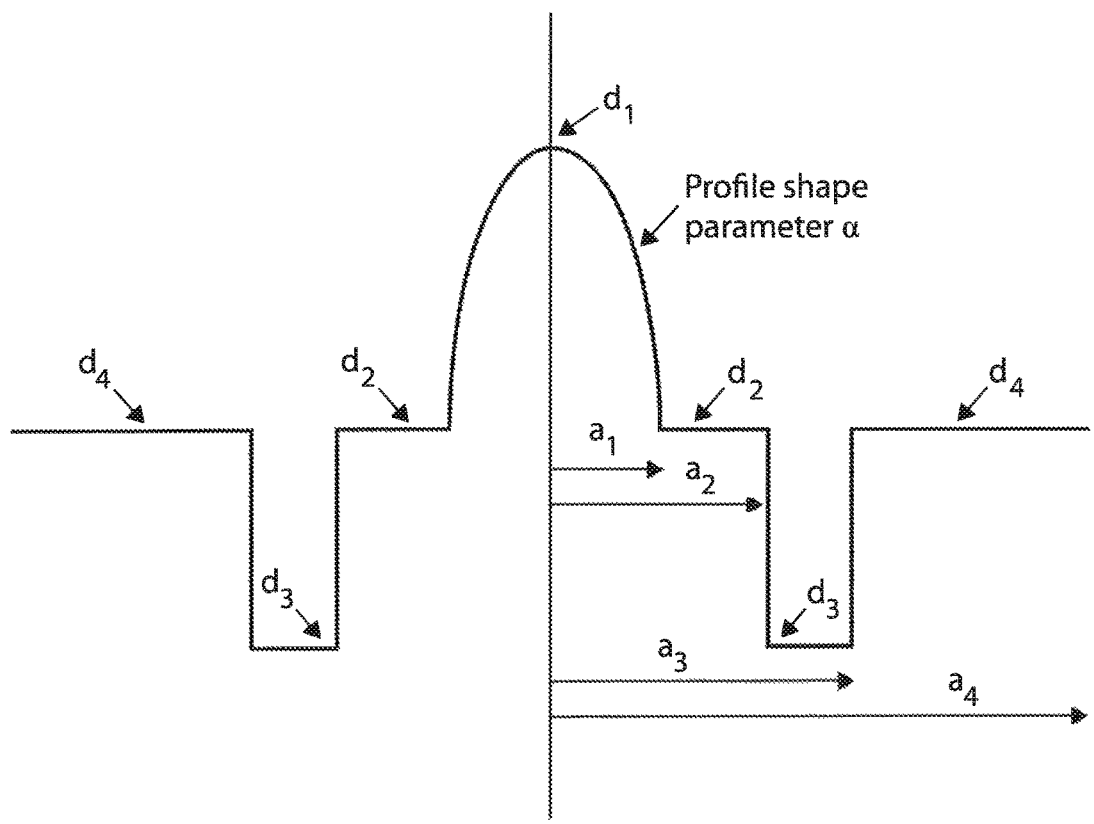
FIG. 1 is a diagram of an optical fiber refractive index profile showing designations for design parameters used in accordance with an embodiment(s) described below. The figure does not represent any dimensional scale.

With reference to FIG. 1, dimensional design parameters relevant to the practice of the invention are shown. The vertical reference line, line d1, represents the center of the multimode optical fiber. The same proportionate profile, with different absolute values, will characterize the preforms used to manufacture the optical fibers.

It was discovered that for specific controlled design ratios and dimensions multimode optical fibers can be produced that are essentially immune to moderately severe bends. The modal structure is also largely unaffected by bending, thus leaving the optical fiber bandwidth essentially unimpaired. Ordinary optical fibers demonstrate significant modal structure change when bent because the high order modes escape into the cladding and mid-order modes mix with into high-order modes causing significant changes in the optical fiber bandwidth. These changes are typically measured as differential mode delay (DMD). DMD techniques and DMD measurements, as related to the invention, will be described in more detail below.

Typical conventional or standard multimode optical fibers, and those to which this invention pertains, have a multimode graded index core with a maximum refractive index in the center of the core and with a decreasing refractive index toward the core/cladding boundary. The decreasing refractive index generally follows a parabolic curve defined by the following equations:

$$d_c(r) = d_1[1 - 2\Delta(r/a_1)^\alpha]^{1/2} \quad (1)$$

$$\Delta = (d_1^2 - d_2^2)/2d_1^2 \quad (2)$$

Parameters in the following description relate to those indicated in FIG. 1. The quantities $d_1$ and $d_2$ are the refractive indices of the core at r=0, and r=$a_1$, respectively. The quantity $a_1$ is the maximum core radius and represents the core to clad boundary. The value a is the core shape profile parameter and defines the shape of the graded refractive index profile. The core is surrounded with cladding of radius denoted by $a_2$. For conventional multimode fibers, the refractive index is maintained at a value of $d_2$ in the radial range between $a_1$ and $a_2$.

A specific design feature of this invention is that a portion within the cladding region near the core-cladding boundary (denoted between radial position $a_2$ and $a_3$ in FIG. 1), referred to herein as a "trench", has a refractive index value of $d_3$ that is different from d2, with a closely controlled width ($a_3$-$a_2$) within the cladding region. Additionally, the outer cladding refractive index $d_4$ may be different from the inner value as denoted by $d_2$. This negative refractive index region (trench) having depths of index ($d_3$-$d_2$, $d_3$-$d_4$), width ($a_3$-$a_2$), together with its location relative to the graded index core ($a_2$-$a_1$) contributes to preserving the modal structure of the inventive fiber when the fiber is tightly bent (as defined later in this description). Thus a new parameter for optical fiber performance is realized and is designated "bend mode performance" ("BMP"), where BMP is the absolute difference between the 0-23 micron DMD in a bent state and in an unbent state. As defined by the DMD test procedure known as the TIA-FOTP-220 Standard, both the BMP and DMD parameters are expressed in picoseconds per meter, or ps/m.

In formulating designs meeting the inventive criteria, the properties of the trench, in particular the trench width $a_3$-$a_2$ and the shoulder width $a_2$-$a_1$ were found to have a large effect on the BMP of optical fibers. In fact, within specific ranges of trench widths and shoulder widths, the mode structure of the optical fiber can remain essentially unchanged even when subjected to extreme bending.

As mentioned previously, relevant changes are typically measured as differential mode delay (DMD). DMD is the difference in propagation time between light energies traveling along different modes in the core of a multimode optical fiber. Multimode optical fiber supports multiple light paths, or modes, that carry light from the transmitter to the receiver. When the energy for a laser pulse is transmitted into the optical fiber, it divides into the different paths. As the energy travels along the multimode optical fiber, DMD will cause the pulse to spread before reaching the receiver. If pulses spread excessively, they may run together. When that occurs, the receiver is not able to discern digital ones from zeros, and the link may fail. This is a problem for 1 Gb/s systems, and limits existing 10 Gb/s systems, and anticipated 40 and 100 Gb/s systems, to only modest distances using conventional multimode fiber. Multimode optical fiber DMD is measured in pico-seconds per meter (ps/m) using an OFS-Fitel developed high-resolution process. This process transmits very short, high-powered 850 nm pulses at many positions, separated by very small steps, across the core of the optical fiber. The received pulses are plotted and the data is used with specially developed OFS software to represent the DMD.

OFS-Fitel pioneered the use of high-resolution DMD as a quality control measure in 1998 to ensure laser bandwidth of production multimode fibers. High-resolution DMD was adopted by international standards committees as the most reliable predictor of laser bandwidth for 10 Gb/s, and emerging 40 and 100 Gb/s, multimode optical fiber systems. OFS-Fitel co-authored the DMD test procedure known as TIA/EIA-455-220. That procedure has become an industry standard and is widely used on production optical fiber to assure reliable system performance for 1 and 10 Gb/s systems. The procedure is also being incorporated in the standards for 40 and 100 Gb/s systems of the future.

Figure 2:
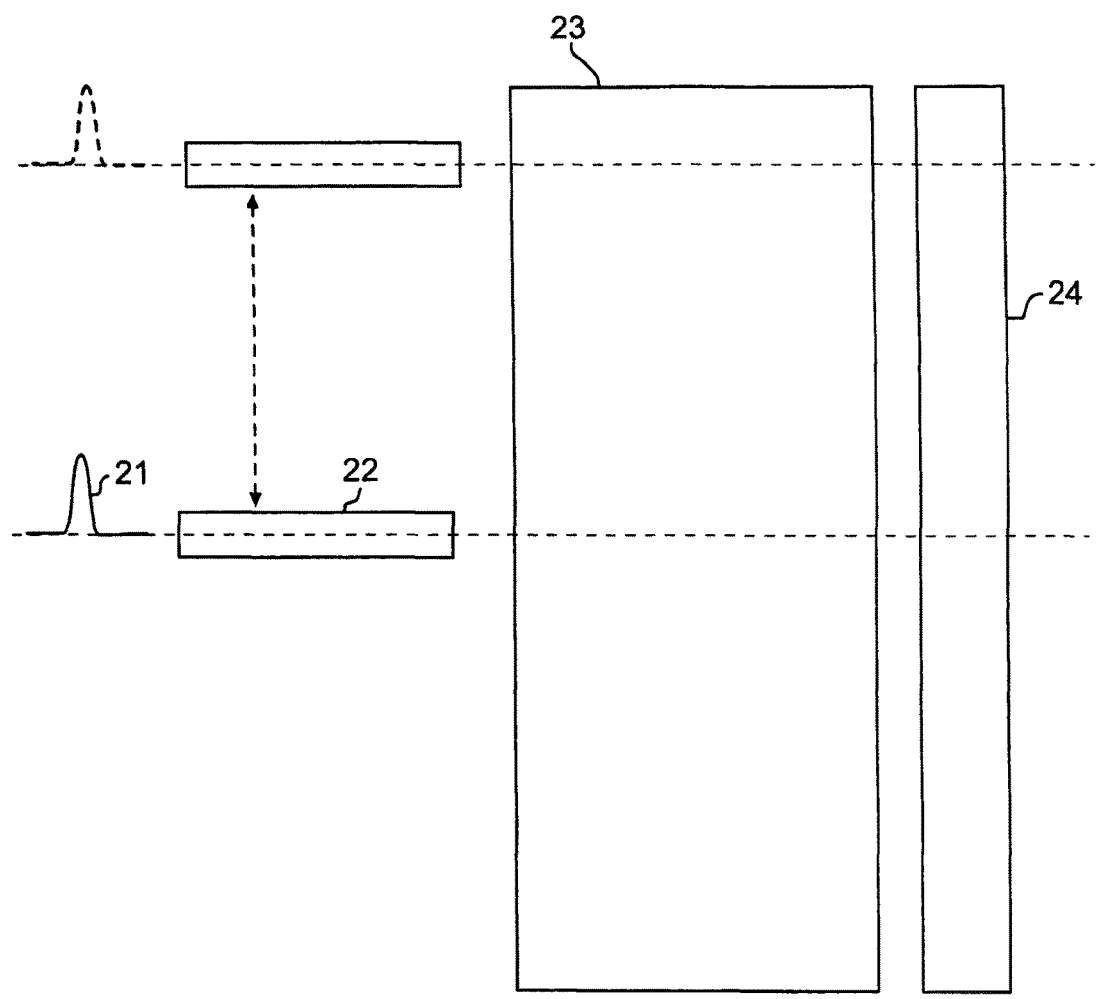
FIG. 2 is a schematic diagram of an apparatus for measuring Differential Mode Delay (DMD), a property used for evaluating the performance of the optical fibers of the invention.

The TIA/EIA-455-220 test procedure is schematically represented in FIG. 2. The core 23 of the multimode fiber to be tested is scanned radially with a single-mode fiber 22 using 850 nm laser emitting pulses 21. The corresponding output pulses at the other end of the fiber core are recorded integrally by the high speed optical receiver on the basis of their locations in relation to the radial position of the single mode fiber. This provides precise information on the modal delay differences between the selectively-excited mode groups at the various radial offsets. The DMD scans are then evaluated on the basis of the multiple scans.

DMD scan data is shown in FIGS. 3a, 3b, 4a, and 4b.

Figure 3A:
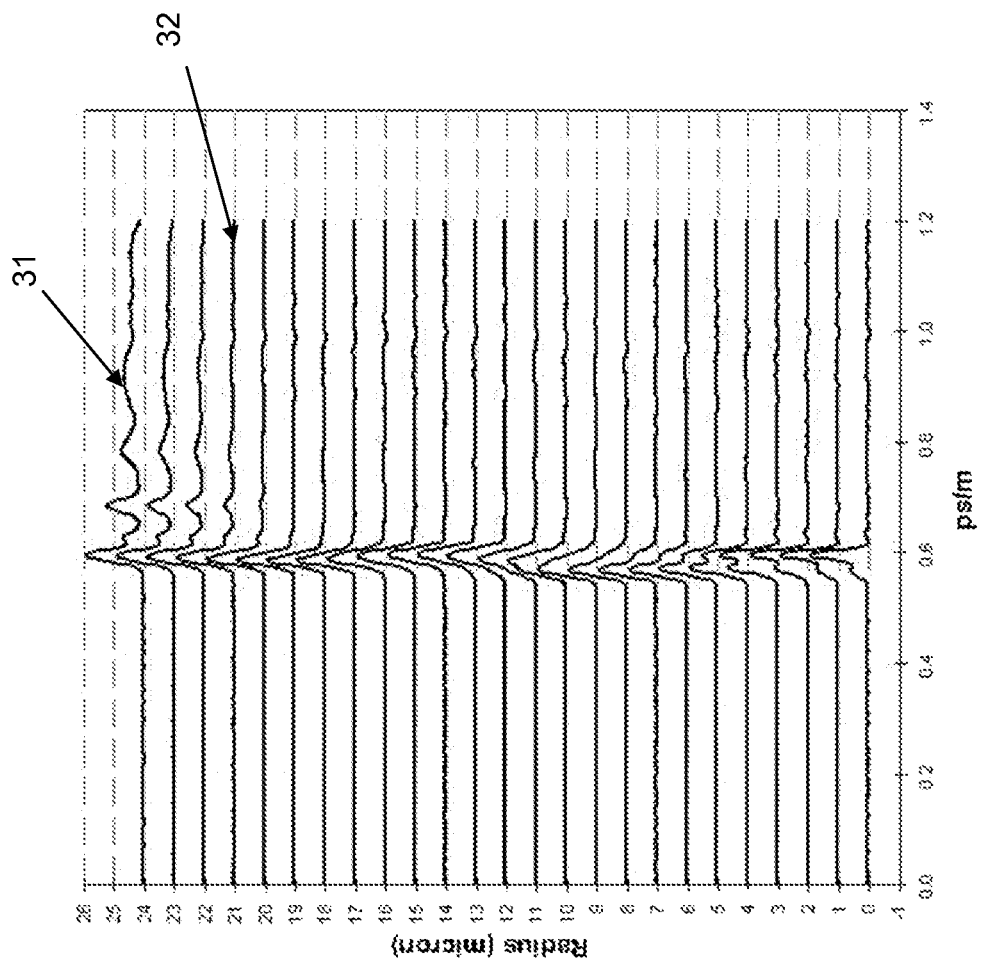
FIGS. 3a and 3b are DMD pulse traces showing the effect of bending on a conventional multimode optical fiber.
Figure 3B:
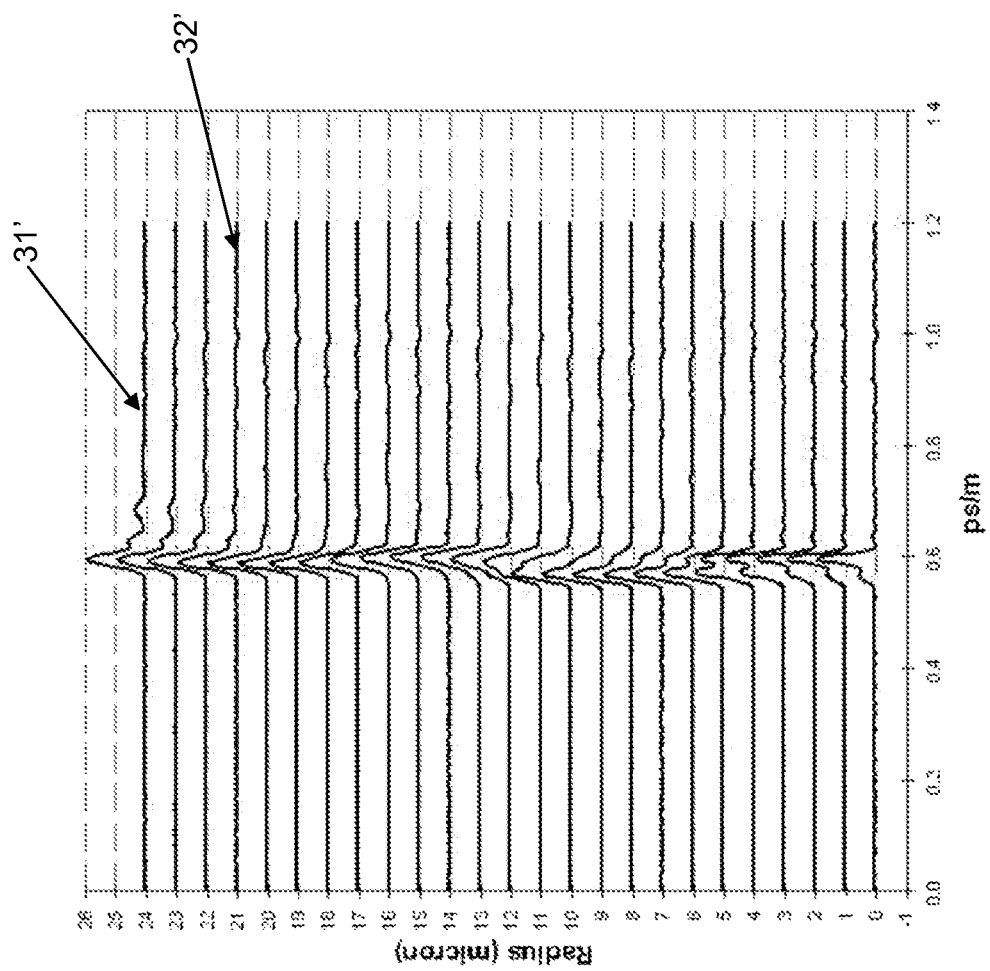

FIGS. 3a and 3b demonstrate how the modal structure in other multimode fiber designs changes when bent tightly compared to the unbent condition.

FIG. 3a shows a DMD pulse trace demonstrating the modal structure of a multimode optical fiber (MMF) in an unbent condition as defined by the TIA/EIA-455-220 Standard. Notice the outer mode structure between radial positions 21 micron (shown at 31) and 24 micron (shown at 32). One can see that at these positions, multiple pulses begin to appear.

FIG. 3b is a DMD pulse trace demonstrating the modal structure of the same MMF shown in FIG. 3a except bent around a 12.8 mm diameter mandrel (defined here as the tightly bent condition). Here the outer mode structure between radial positions 21 micron (shown at 31') and 24 micron (shown at 32') has undergone a significant change between the unbent condition of FIG. 3a and the bent condition. Specifically, the pulses shown between 21 and 24 microns in FIG. 3b have diminished significantly, thus showing a substantial loss in signal power.

In the comparison of FIGS. 3a and 3b, it is evident that the outer mode structure and the DMD value computed for the 0-23 radial have changed dramatically. In addition, the power traveling in the outer modes (at 19 microns and beyond) has dropped significantly, suggesting that the modal energy has been redistributed and more power is escaping into cladding modes. This redistribution of modal energy has two effects. One is that the fiber loss, when bent substantially, increases, as is well known. However, not observed prior to this invention are the effects on modal structure relative to the bent state.

In bit error rate (BER) systems testing, it has been shown that the modal bandwidth and additional loss in other MMF designs and in standard fibers, results in significant penalties that cause the link to fail (>$10^{-12}$ BER) when measured under tight bends. With fibers made by the present invention, it has been shown that the penalty in BER systems testing is greatly minimized compared to tests done with other MMF and standard fibers, and the link operates with better than $10^{-12}$ BER.

Figure 4A:
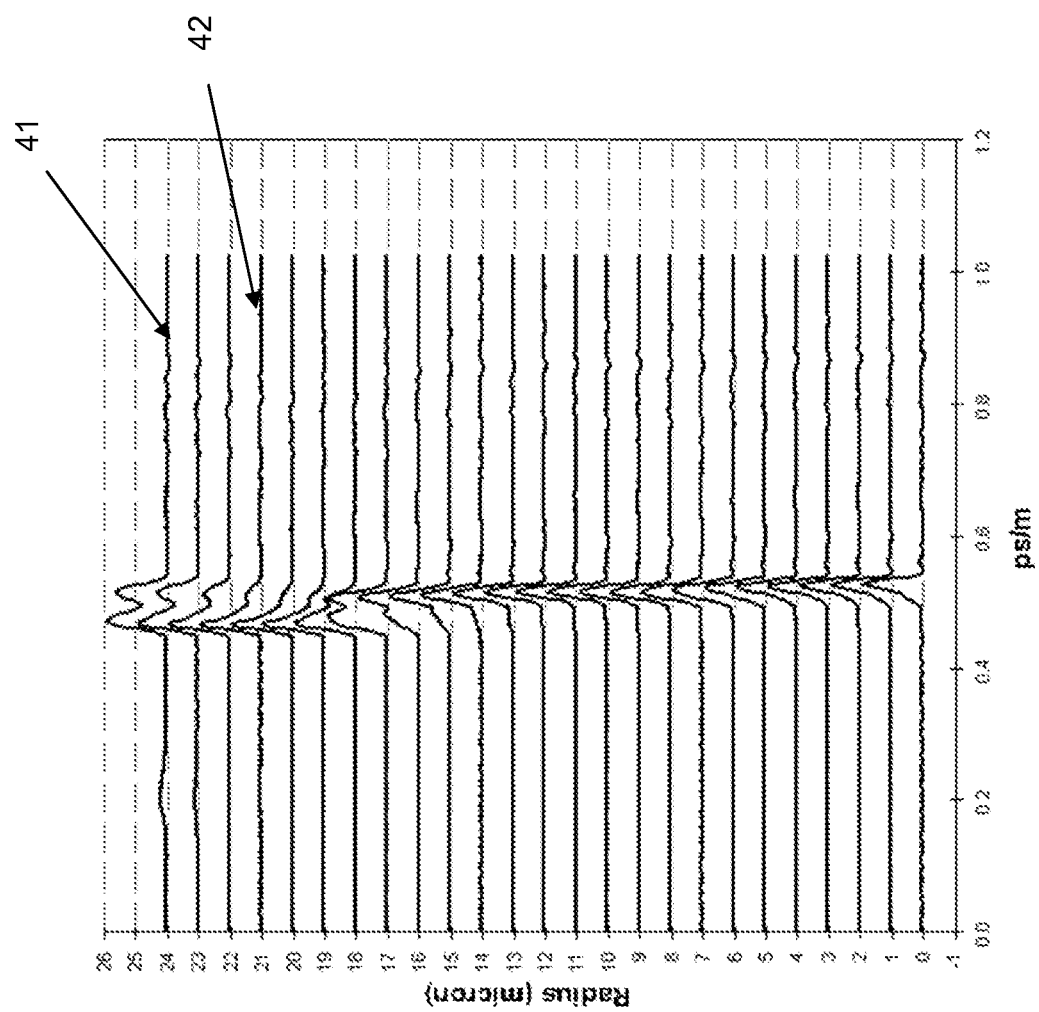
FIGS. 4a and 4b, are DMD traces, to be compared with FIGS. 3a and 3b, showing the effect of bending on a multimode optical fiber of the invention.
Figure 4B:
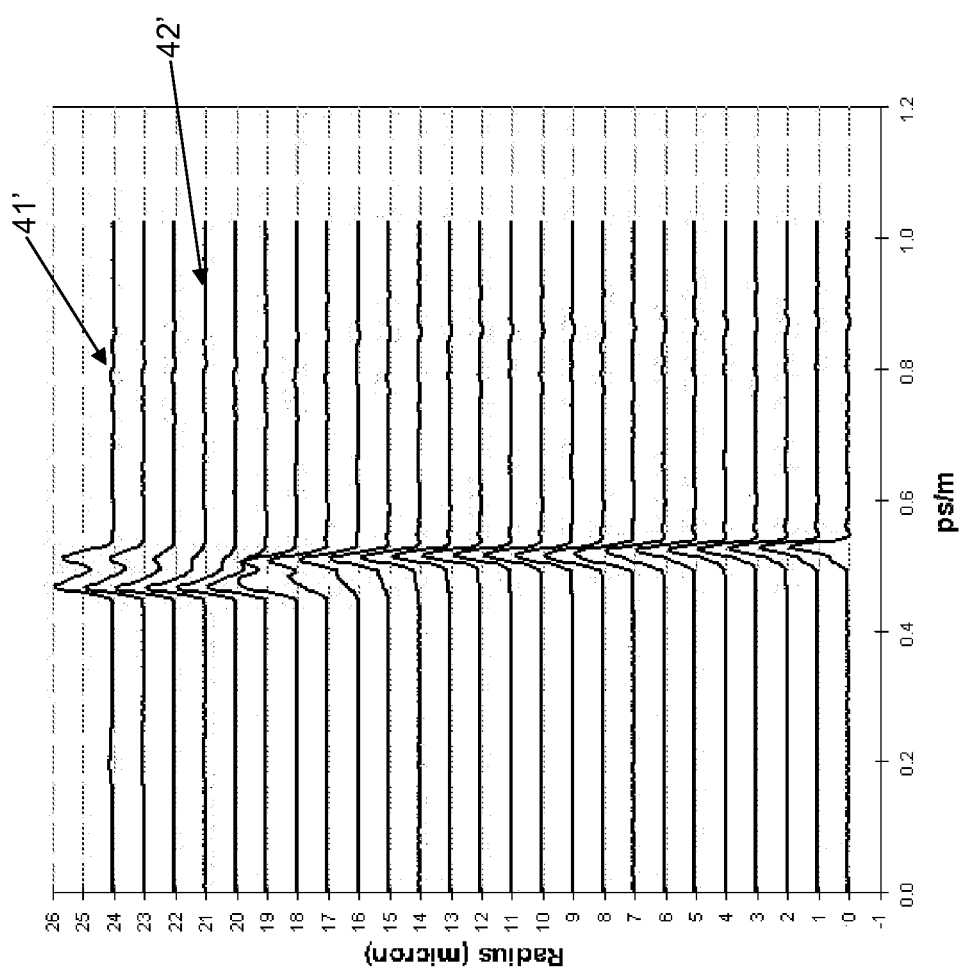

FIGS. 4a and 4b demonstrate that the modal structure for multimode fiber designs according to this invention does not change when bent tightly compared to the unbent condition.

FIG. 4a shows a DMD pulse trace demonstrating the modal structure of MMF made in accordance with an embodiment of the invention. The pulse trace of the MMF is shown in FIG. 4a in the unbent condition. Notice the outer mode structure between radial positions 21 micron (shown at 41) and 24 micron (shown at 42). Similar to the DMD pulse trace shown in FIG. 3a, pulses begin to appear in the outer mode structure.

FIG. 4b shows a corresponding DMD pulse trace demonstrating the modal structure of the same MMF as shown in FIG. 4a, except bent around a 12.8 mm diameter mandrel (the tightly bent condition). Notice the outer mode structure between radial positions 21 micron (shown at 41') and 24 micron (shown at 42') remains unchanged between the unbent and bent conditions. Thus not only is the power loss of the MMF shown in FIGS. 4a and 4b minimal in the bent state, but the original modal structure remains essentially unchanged and intact.

Figure 5:
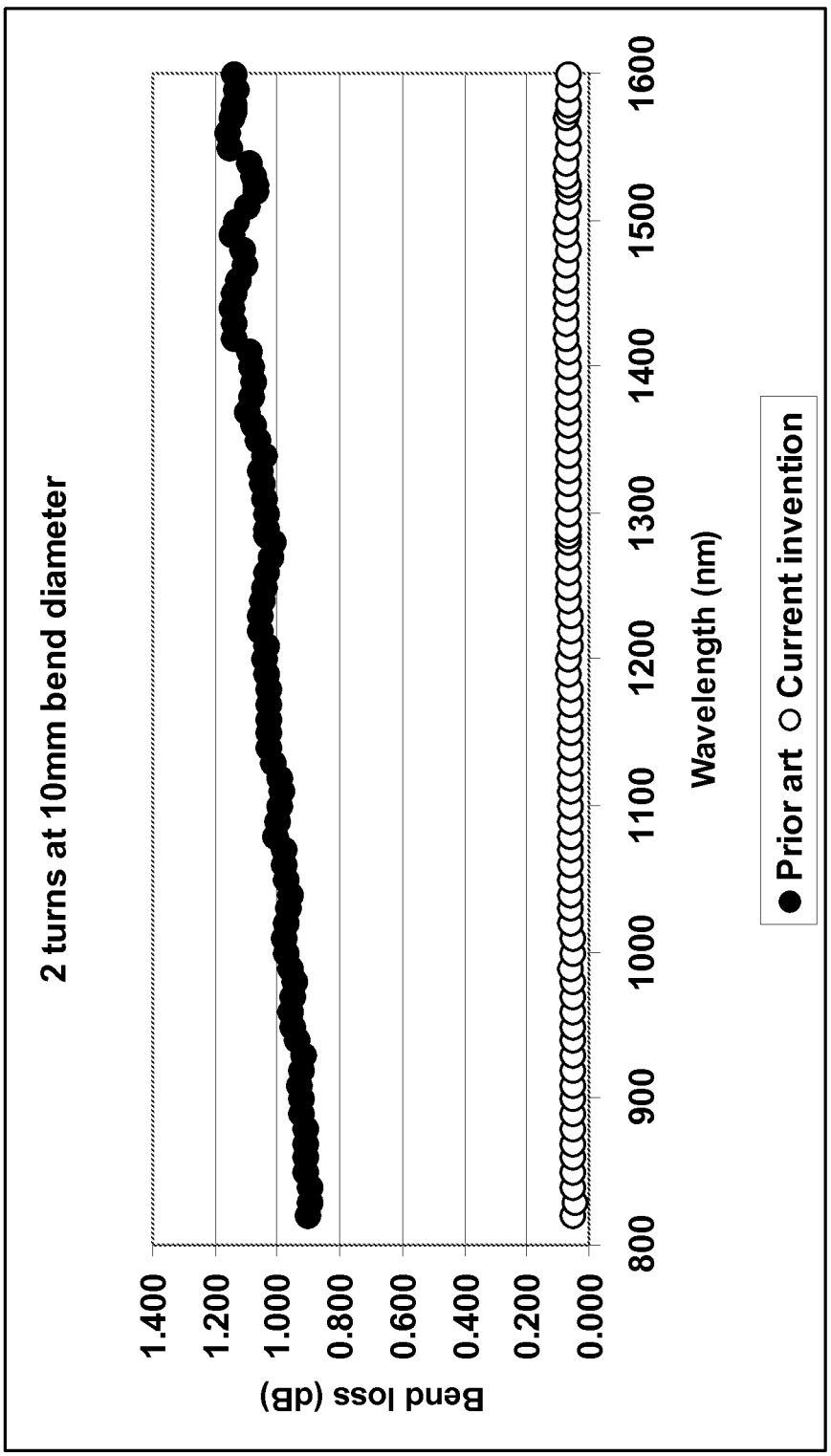
FIG. 5 is a plot of loss vs. wavelength comparing two multimode optical fibers, one a conventional optical fiber and the other designed according to the invention.

Having preserved the modal structure, a comparison of the measured added power loss for the MMF fiber (upper curve) vs. standard fiber (lower curve) is illustrated in FIG. 5. The measurement is of the bend loss of each fiber with 2 turns around a 10 mm diameter mandrel.

It should be evident that, due to the preservation of high bandwidth in addition to low bend loss, the improved multimode optical fibers of the invention need not be restricted to short jumpers. This optical fiber enables applications in, for example, high transmission links; up to 2 km at 1 Gb/s, up to 550 m at 10 Gb/s, and estimated up to 100 m at 40 Gb/s or 100 Gb/s.

Table 1 provides recommended parameters associated with the refractive-index profile shown in FIG. 1. Within the ranges provided for these parameters, multimode optical fibers with high bandwidth and ultra-low bend loss may be simultaneously achieved.

TABLE 1

| Designation | Parameter | Minimum | Maximum | Optimum |
| --- | --- | --- | --- | --- |
| a1 | Core radius µm | 7 | 50 | 25 +/− 4 |
| (a2 − a1)/a1 | Ratio | 0.1 | 0.7 | 0.2 +/− 0.1 |
| (a3 − a2)/a1 | Ratio | 0.3 | 0.6 | 0.4 +/− 0.1 |
| a4 | Clad. radius µm | 30 | 250 | 62.5 +/− 20 |
| d1-d4 | Index Δ | −0.019 | 0.032 | 0.0137 +/− 0.01 |
| d2-d4 | Index Δ | −0.01 | 0.01 | 0 +/− 0.005 |

TABLE 1-continued

| Designation | Parameter | Minimum | Maximum | Optimum |
| --- | --- | --- | --- | --- |
| d3-d4 | Index Δ | −0.05 | −0.0025 | −0.011 +/− 0.008 |
| d4 | Index | 1.397 | 1.511 | 1.46 +/− 0.03 |
| Profile shape | Alpha | 1.6 | 2.2 | 2.08 +/− 0.12 |

As mentioned earlier, one of these parameters, the trench width (expressed in Table I as normalized to the core radius by the equation $(a_3-a_2)/a_1$) was found to be especially important in determining the bend mode preservation of optical fibers. For example, selecting the midpoint of the range for core radius (28.5 microns) of the ranges in Table I, when the minimum value for the parameter $(a_3-a_2)/a_1$ is 0.3 the corresponding trench width is 8.55 microns. Expressed as the area of the trench in a cross section of the optical fiber the area is 1913 microns$^2$.

The following specific examples give parameters for optical fibers with demonstrated excellent BMP. Dimensions are in micrometers; area in micrometers squared.

Example I

| Designation | Parameter | Value |
| --- | --- | --- |
| a1 | Core radius | 26.12 |
| a2 | Trench start | 28.85 |
| a3 | Trench end | 38.9 |
| a4 | Clad radius | 62.5 |
| d1 | Index | 1.472 |
| d2 | Index | 1.457 |
| d3 | Index | 1.449 |
| d4 | Index | 1.449 |
| Profile shape | Alpha | 2.08 |
| $T_W$ | Trench width | 10.05 |
| $T_A$ | Trench area | 2139 |

Example II

| Designation | Parameter | Value |
| --- | --- | --- |
| a1 | Core radius | 28.4 |
| a2 | Trench start | 28.81 |
| a3 | Trench end | 40.71 |
| a4 | Clad radius | 62.5 |
| d1 | Index | 1.472 |
| d2 | Index | 1.457 |
| d3 | Index | 1.449 |
| d4 | Index | 1.457 |
| Profile shape | Alpha | 2.08 |
| $T_W$ | Trench width | 11.9 |
| $T_A$ | Trench area | 2608 |

Example III

| Designation | Parameter | Value |
| --- | --- | --- |
| a1 | Core radius | 24.4 |
| a2 | Trench start | 28 |
| a3 | Trench end | 40.72 |
| a4 | Clad radius | 62.5 |
| d1 | Index | 1.470 |
| d2 | Index | 1.457 |
| d3 | Index | 1.449 |

-continued

| Designation | Parameter | Value |
| --- | --- | --- |
| d4 | Index | 1.457 |
| Profile shape | Alpha | 2.08 |
| $T_W$ | Trench width | 12.72 |
| $T_A$ | Trench area | 2746 |

Example IV

| Designation | Parameter | Value |
| --- | --- | --- |
| a1 | Core radius | 25 |
| a2 | Trench start | 25.5 |
| a3 | Trench end | 36.9 |
| a4 | Clad radius | 62.5 |
| d1 | Index | 1.472 |
| d2 | Index | 1.457 |
| d3 | Index | 1.449 |
| d4 | Index | 1.457 |
| Profile shape | Alpha | 2.08 |
| $T_W$ | Trench width | 11.4 |
| $T_A$ | Trench area | 2235 |

Example V

| Designation | Parameter | Value |
| --- | --- | --- |
| a1 | Core radius | 25 |
| a2 | Trench start | 29.4 |
| a3 | Trench end | 40.75 |
| a4 | Clad radius | 62.5 |
| d1 | Index | 1.472 |
| d2 | Index | 1.457 |
| d3 | Index | 1.449 |
| d4 | Index | 1.457 |
| Profile shape | Alpha | 2.08 |
| $T_W$ | Trench width | 11.35 |
| $T_A$ | Trench area | 2501 |

Example VI

| Designation | Parameter | Value |
| --- | --- | --- |
| a1 | Core radius | 25 |
| a2 | Trench start | 27.7 |
| a3 | Trench end | 39.1 |
| a4 | Clad radius | 62.5 |
| d1 | Index | 1.472 |
| d2 | Index | 1.457 |
| d3 | Index | 1.449 |
| d4 | Index | 1.457 |
| Profile shape | Alpha | 2.08 |
| $T_W$ | Trench width | 11.4 |
| $T_A$ | Trench area | 2391 |

Example VII

| Designation | Parameter | Value |
| --- | --- | --- |
| a1 | Core radius | 25 |
| a2 | Trench start | 30 |
| a3 | Trench end | 40 |
| a4 | Clad radius | 62.5 |
| d1 | Index | 1.472 |
| d2 | Index | 1.457 |
| d3 | Index | 1.446 |
| d4 | Index | 1.457 |
| Profile shape | Alpha | 2.08 |
| $T_W$ | Trench width | 10 |
| $T_A$ | Trench area | 2200 |

Example VIII

| Designation | Parameter | Value |
| --- | --- | --- |
| a1 | Core radius | 23.5 |
| a2 | Trench start | 28 |
| a3 | Trench end | 38.23 |
| a4 | Clad radius | 62.5 |
| d1 | Index | 1.470 |
| d2 | Index | 1.457 |
| d3 | Index | 1.449 |
| d4 | Index | 1.457 |
| Profile shape | Alpha | 2.08 |
| $T_W$ | Trench width | 10.23 |
| $T_A$ | Trench area | 2129 |

The values given in these tables are precise values. However, it will be understood by those skilled in the art that minor departures, e.g. +/−2%, will still provide performance results comparable to those indicated below.

To demonstrate the effectiveness of these optical fiber designs, the BMP was measured for each Example above and is given in the following table, Table II. The units are picoseconds per meter.

TABLE II

| Example | Condition | MW23 | BMP |
| --- | --- | --- | --- |
| 1 | Unbent | 0.168 | 0.009 |
| 1 | Bent | 0.159 | |
| 2 | Unbent | 0.159 | −0.002 |
| 2 | Bent | 0.161 | |
| 3 | Unbent | 0.298 | 0.069 |
| 3 | Bent | 0.229 | |
| 4 | Unbent | 0.884 | 0.054 |
| 4 | Bent | 0.83 | |
| 5 | Unbent | 0.193 | 0.026 |
| 5 | Bent | 0.167 | |
| 6 | Unbent | 0.582 | 0.188 |
| 6 | Bent | 0.394 | |
| 7 | Unbent | 0.123 | 0.004 |
| 7 | Bent | 0.119 | |
| 8 | Unbent | 0.291 | 0.06 |
| 8 | Bent | 0.231 | |

Two of these design parameters stand out. One is the core radius. It was found that optical fibers exhibiting the best mode preservation performance had a core radius in the range of 22 to 28 microns, but that a properly designed MMF with a core radius in the range 7-50 microns will also exhibit modal structure integrity. The properties of the trench are also considered important parameters in designing a BMP.

The trench width $T_W$ should be at least 2.5 microns, and preferably between 10 and 13 microns.

Expressed in terms of trench area, $T_A$, a range of 1500 to 3500 microns² is recommended, and preferably the range is 2000 to 2900 microns².

The discovery of this narrow range, in which optical fibers may be designed that show excellent BMP, is highly unexpected. The design goal of producing optical fibers that exhibit this unusual behavior is itself considered to be novel in optical fiber technology. Prior to demonstrating the BMP of the eight examples described above there existed no indication in the art that optical fibers with this BMP were possible. The data provided in Table II suggests a target figure of merit for BMP. For most of the examples, the absolute variation in the 0-23 um DMD values between bent and unbent conditions is within the range of 0 to 0.069 picoseconds per meter. Based on this measured performance data, a target figure of merit is an absolute value less than 0.07 picoseconds per meter, and preferably less than 0.02 picoseconds per meter.

Expressed in terms of trench area, $T_A$, a range of 500 to 3500 microns² is recommended, and preferably the range is 2000 to 2900 microns².

The core delta n in this work is between 0.0125 and 0.016. The trench depth (index depth) appears to be a less vital parameter than the width, i.e., larger variations appear to be useful. A trench depth (index difference) that is lower than the inner cladding ($d_2$) by a value of 0.0025 to 0.012 is recommended, with a preferred trench depth being between 0.003 to 0.008 lower than the inner cladding ($d_2$). The difference is measured from the next adjacent inner cladding. Refractive index differences expressed in this specification refer to index differences based on the index of silica (1.46).

The optical fibers described above may be fabricated using any of a variety of known optical fiber manufacturing techniques, for example, Outside Vapor Deposition (OVD), Chemical Vapor Deposition (CVD), Modified Chemical Vapor Deposition (MCVD), Vapor Axial Deposition (VAD), Plasma enhanced CVD (PCVD), etc.

In the course of the investigations described above it was discovered that the multi-mode optical fibers of this invention provide unique connectivity matching with standard multi-mode optical fibers.

A variety of bend insensitive multi-mode fibers (BIMMF) have been described in the prior art. In an optical link, when two or more multimode fibers having different profile designs are connected, a mismatch of far-field intensity profile between any two connected fibers might significantly alter mode power distribution, which could have unpredictable or detrimental effect on the bandwidth performance of the link. Therefore, in a link, connecting two fibers of different designs is usually not recommended. If different fibers have to be used in one link, it is preferred that such fibers have similar far-field intensity profiles (under the same launch condition), and further, that the far-field intensity profiles be maintained when light propagates from one fiber to the other.

However, due to the design of these prior art BIMMF, the interoperability and connectivity with existing standard MMFs are considerably compromised. That is due, primarily, to a mismatch in the far-field profiles between the prior art BIMMF and standard MMFs. This mismatch creates significant optical energy loss each time a BIMMF is connected to a standard MMF optical fiber design. In contrast, when the optical fibers of this invention are connected to standard MMFs the far-field profile and numerical aperture are preserved.

Figure 6:
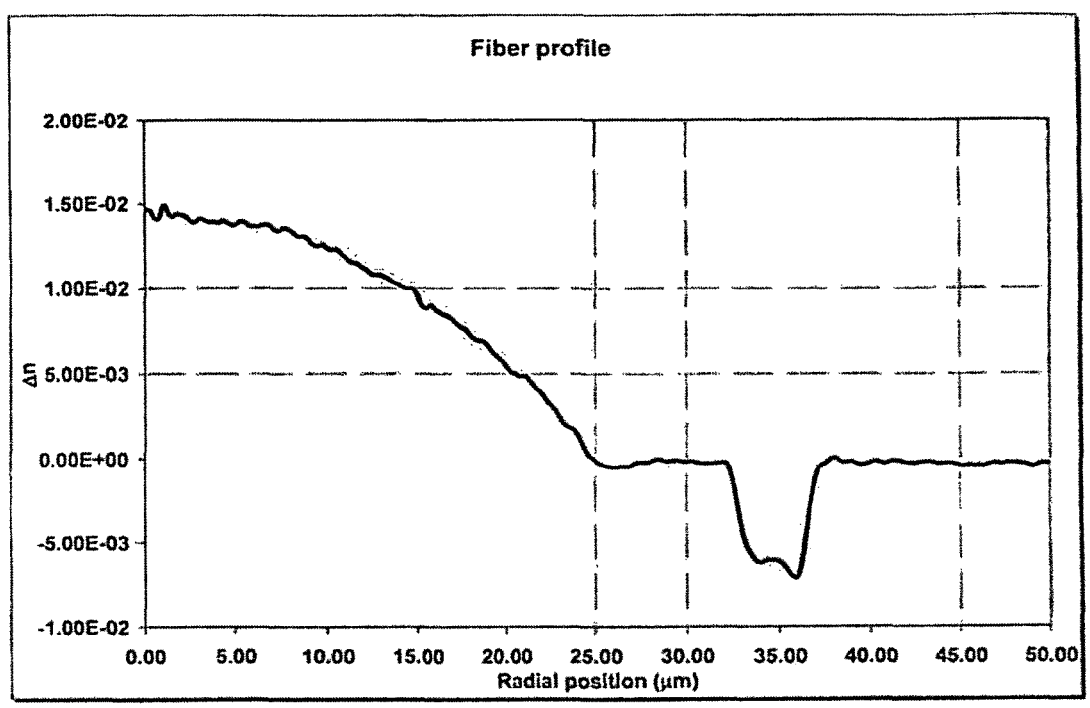
FIG. 6 shows the far-field pattern of a bend insensitive multimode optical fiber according to an embodiment of the present invention.

This incompatibility/compatibility in far field profiles is demonstrated in FIGS. 6-12. FIG. 6 plots normalized intensity vs. angle to show the far-field intensity profile for an inventive bend insensitive multimode optical fiber in accordance with embodiments of the present invention.

Figure 7:
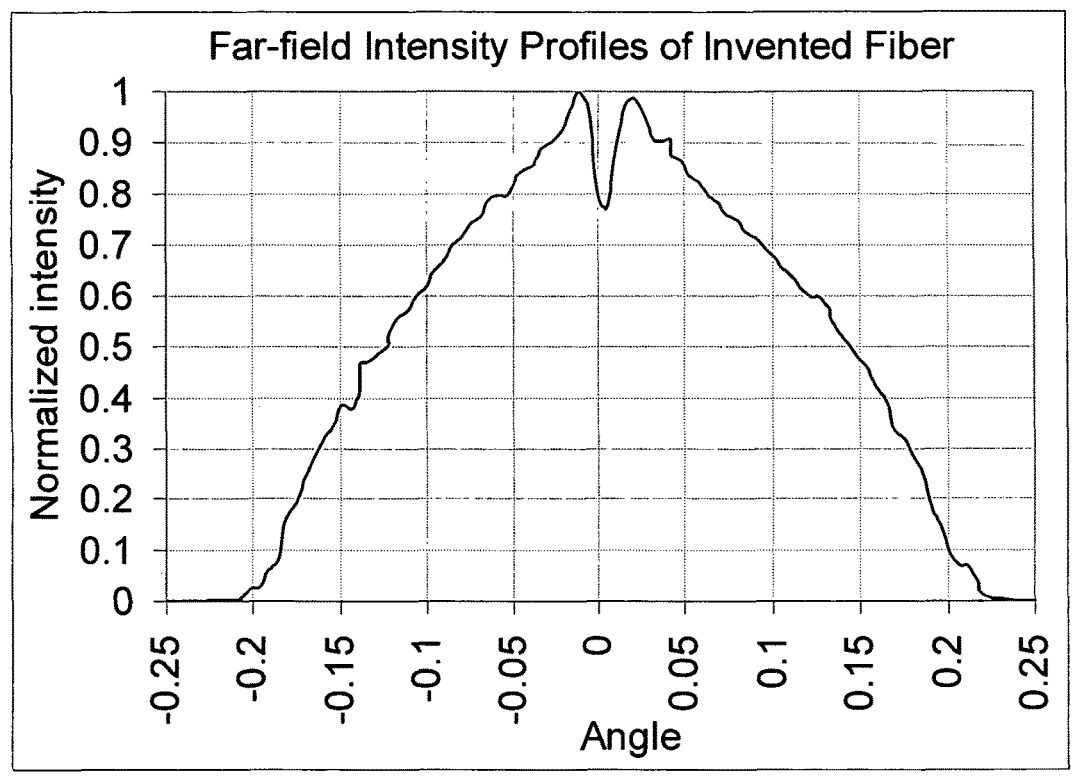
FIG. 7 shows the far-field intensity profile for a standard multi-mode optical fiber.
Figure 8:
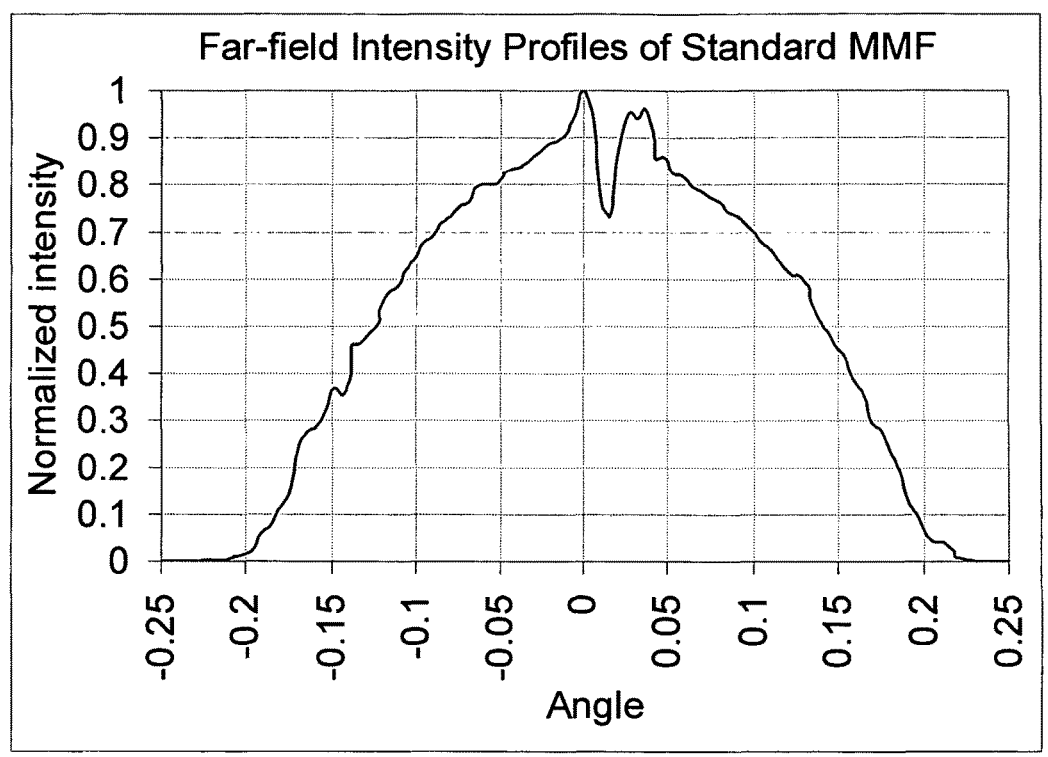
FIG. 8 compares the far-field intensity profile of FIG. 7 with a first prior art multi-mode optical fiber example.
Figure 9:
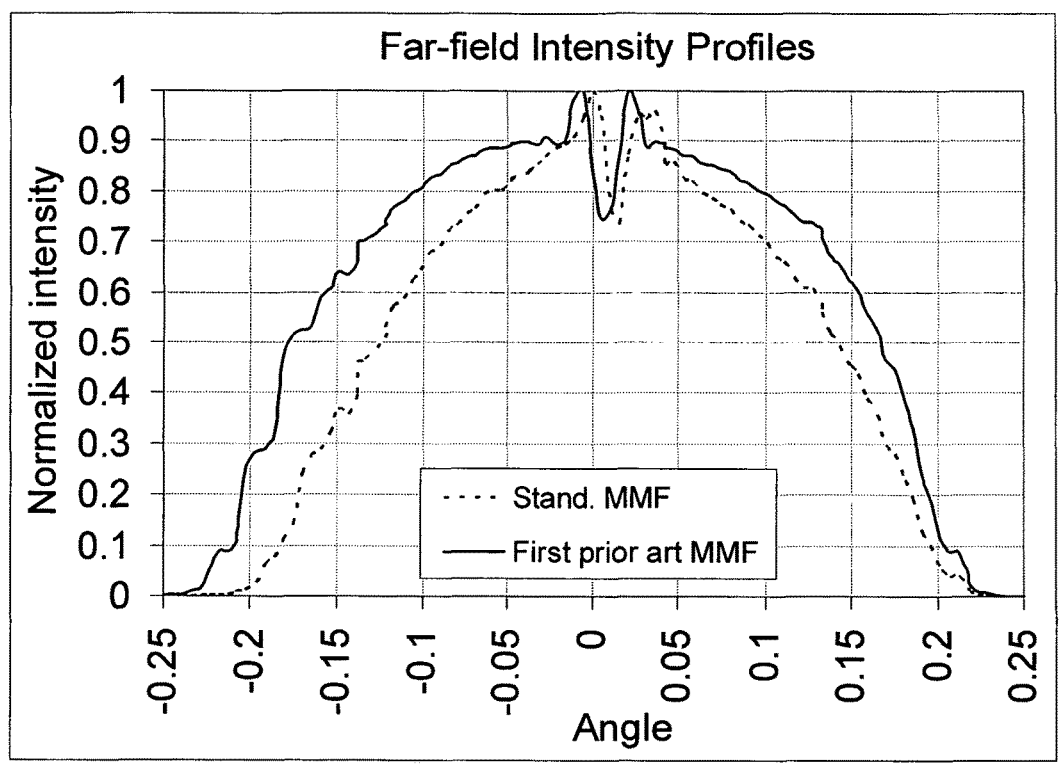
FIG. 9 compares the far-field intensity profile of FIG. 7 with a second prior art multi-mode optical fiber example.

To illustrate this incompatibility between standard MMFs and conventional prior art BIMMFs, the far-field pattern of a standard MMF is shown in FIG. 7. In FIG. 8, this far-field pattern (dashed curve) was compared with a first sample of prior art BIMMF (solid curve). The mismatch in far field patterns is evident. A second BIMMF sample was also compared with a standard MMF. The far-field patterns for this comparison are given in FIG. 9, where significant mismatch is also evident between the far-field pattern of the standard MMF (dashed curve) and the second sample of prior art BIMMF (solid curve).

Figure 10:
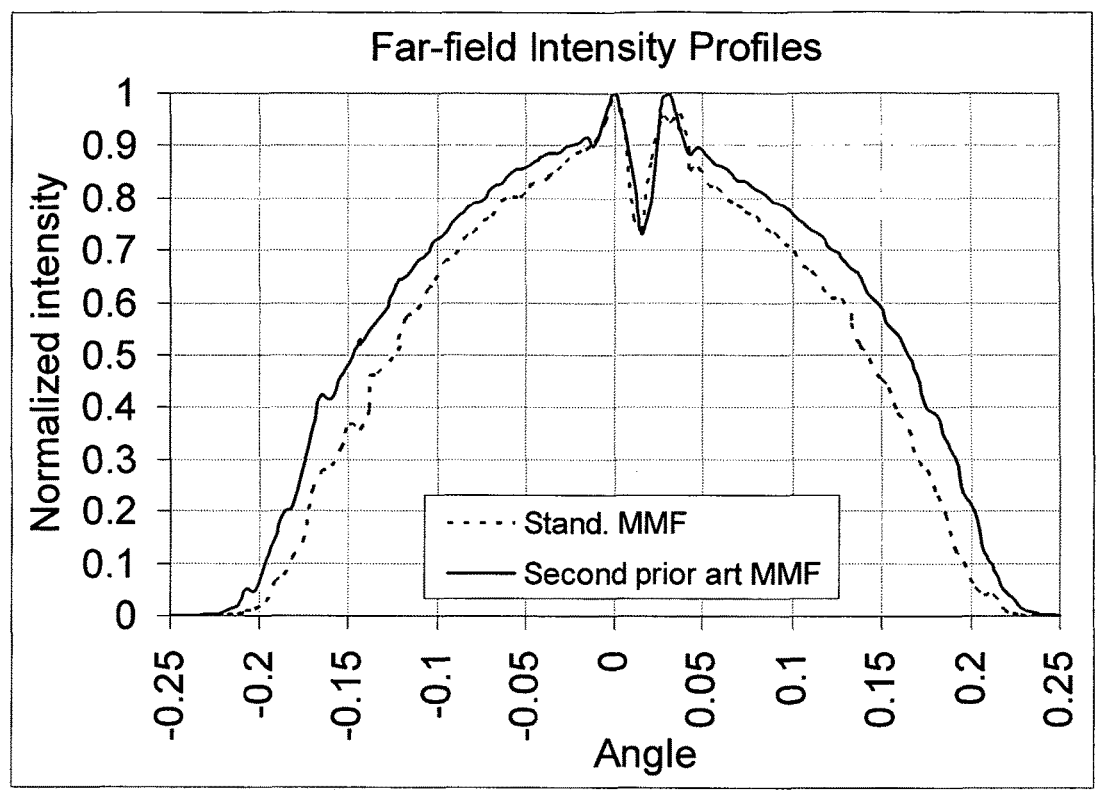
FIG. 10 compares the far-field intensity profile of FIG. 6 with the far-field intensity profile for a standard multi-mode optical fiber (as shown in FIG. 7)

FIG. 10 compares the far-field intensity profile of the inventive multi-mode optical fiber with the far-field intensity profile for a standard multi-mode optical fiber (shown in FIG. 7). The match between these far-field patterns is evident. This demonstrates that any connection between the bandwidth preserving optical fibers of the invention and standard MMFs will show reduced loss when compared with similar MMF connections.

Figure 11:
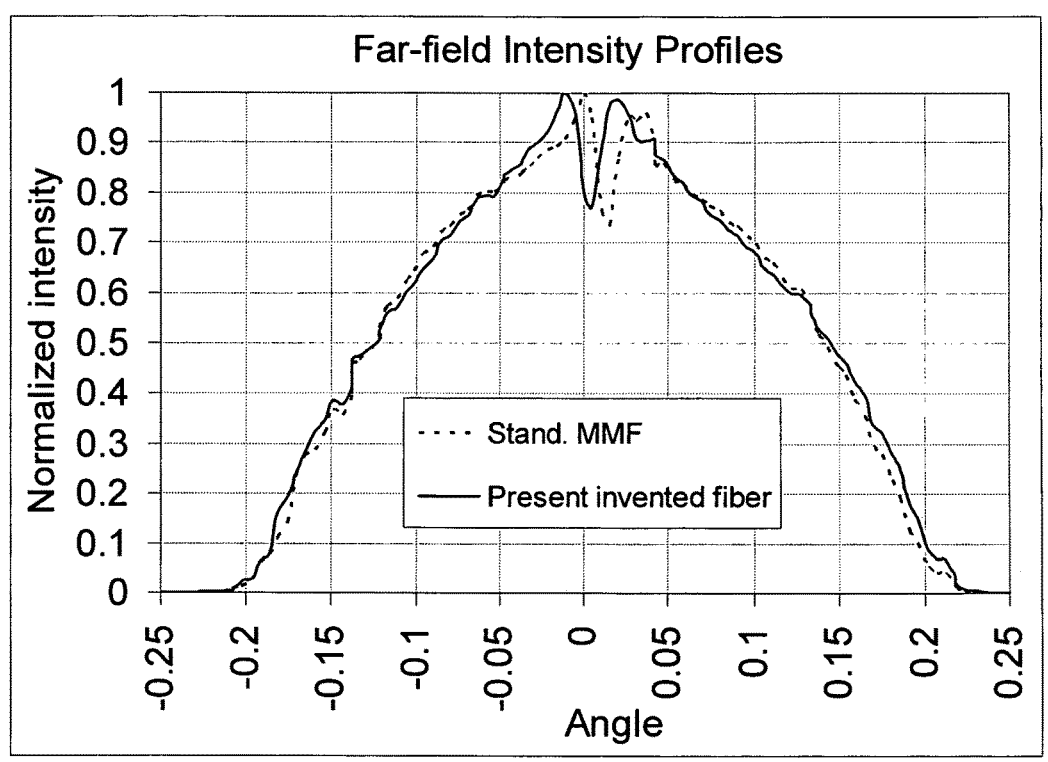
FIG. 11 demonstrates the difference in far-field intensity profiles of a standard multimode fiber connected to different fiber types.
Figure 12:
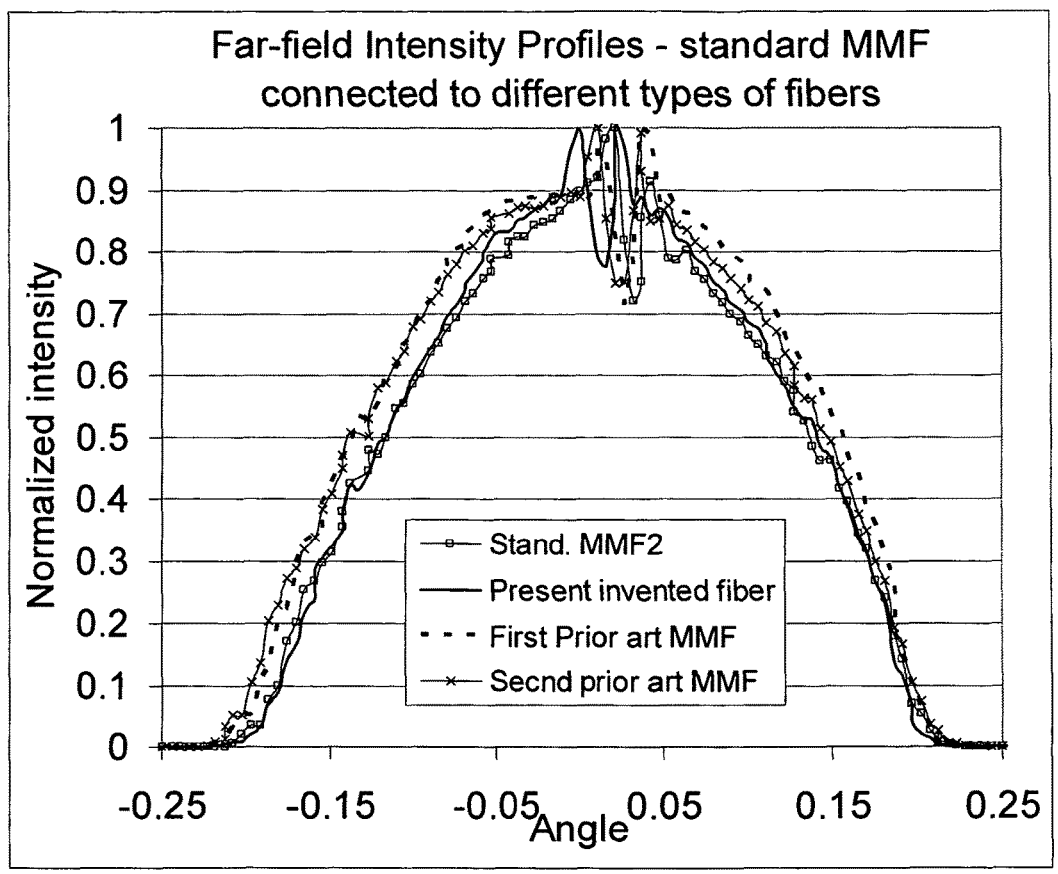
FIG. 12 compares the far-field intensity profiles of standard multi-mode optical fiber connected to different types of fibers.

As further shown in FIGS. 11 and 12, it can be seen that the shape of the profiles for the case of the standard MMF connected to either of the two examples of prior art MMF are considerably different from the case of the standard MMF connected to the inventive multimode fiber. That is, when light is launched into the two exemplary prior art fibers from standard MMF, the far-field intensity profiles cannot be maintained. The resultant change in the mode power distribution deteriorates the performance of the optical link. Thus, it is evident from the figures shown that the inventive fiber overcomes such drawbacks with an improved match to the far-field profile of the standard MMF.

In numerical terms the following table, Table III, compares the difference and similarities of the fiber property numerical aperture as determined from the far-field profiles illustrated in FIGS. 7-12.

TABLE III

| Fiber type | Numerical Aperture (NA) | Fibers connected together | NA of connected pair |
|---|---|---|---|
| standard MMF | 0.199 | | |
| standard MMF2 | 0.198 | Standard MMF - Standard MMF2 | 0.196 |
| Present Invented fiber | 0.204 | Standard MMF - Present invented fiber | 0.194 |
| First Prior art MMF | 0.212 | Standard MMF - First Prior art MMF | 0.203 |
| Secnd prior art MMF | 0.207 | Standard MMF - Secnd prior art MMF | 0.204 |

A standard multimode fiber typically is defined as a fiber with a graded index defined by Equation 1, having an alpha ranging from 1.6-2.2, a core diameter measured by TIA/EIA-455-176 with a value between 47 and 53 microns, and a numerical aperture (NA) measured by TIA/EIA-455-177 with a value between 0.18 and 0.22. Such standard or conventional MMFs typically fall within the TIA-492-AAAD or ITU-T G.651.1 standards. Additionally, standard MMFs are often defined as MMFs without a trench. A trench is defined as a region of negative delta bounded on each side by a region of less negative, zero, or positive delta.

Various additional modifications of this invention will occur to those skilled in the art. All deviations from the specific teachings of this specification that basically rely on the principles and their equivalents through which the art has been advanced are properly considered within the scope of the invention as described and claimed.

The invention claimed is:

1. An optical fiber comprising:
a first length of optical fiber further comprising a core region with a first radius a1 and a profile alpha, an inner cladding extending radially from a1 to second radius a2, a trench extending radially from second radius a2 to a third radius a3, and an outer cladding extending to a fourth radius a4, wherein a maximum refractive index of the core region is d1, a refractive index of the inner cladding is d2, a refractive index of the trench is d3, and a refractive index of the outer cladding is d4, the first length of optical fiber exhibiting a change in differential mode delay of less than 0.07 picoseconds per meter from an unbent state to bent state, given a reference state of 2 turns around a 10 mm diameter mandrel, and wherein: a1 is 7-50 microns; alpha is 1.6 to 2.2; (a2−a1)/a1 is 0.1 to 0.7; (a3−a2)/a1 is 0.3 to 0.6; a4 is 30-250 microns; d1-d4 is −0.019 to 0.032; d2-d4 is −0.01 to 0.01; d3-d4 is −0.05 to −0.0025; d4 is 1.4 to 1.511.

2. The optical fiber of claim 1 wherein:
$a_1$: 22-29 micrometers; and
$a_3-a_2$: at least 2.5 microns.

3. The optical fiber of claim 2 wherein $a_3-a_2$ is in the range 10-13 microns.

4. The optical fiber of claim 1 wherein the trench has an area in the range 500-3500 micrometers$^2$.

5. The optical fiber of claim 4 wherein the trench has a refractive index of 1.452 or less.

6. The optical fiber of claim 1 wherein the trench has an area in the range 2000-2900 micrometers$^2$.

7. The optical fiber of claim 1 wherein the trench has a refractive index that is at least 0.0025 below an inner cladding of the optical fiber.

8. The optical fiber of claim 1 wherein:
$a_1$ is 26.12 microns+/−2%;
$a_2$ is 28.85+/−2%;
$a_3$ is 38.9+/−2%;
$a_4$ is 62.5+/−2%;
$d_1$ is 1.472+/−2%;
$d_2$ is 1.457+/−2%;
$d_3$ is 1.449+/−2%;
$d_4$ is 1.457+/−2%; and
alpha is 2.08+/−2%.

9. The optical fiber of claim 1 wherein:
$a_1$ is 28.4 microns+/−2%;
$a_2$ is 28.81+/−2%;
$a_3$ is 40.71+/−2%;
$a_4$ is 62.5+/−2%;
$d_1$ is 1.472+/−2%;
$d_2$ is 1.457+/−2%;
$d_3$ is 1.449+/−2%;
$d_4$ is 1.457+/−2%; and
alpha is 2.08+/−2%.

10. The optical fiber of claim 1 wherein:
$a_1$ is 24.4 microns+/−2%;
$a_2$ is 28+/−2%;
$a_3$ is 40.72+/−2%;
$a_4$ is 62.5+/−2%;
$d_1$ is 1.470+/−2%;
$d_2$ is 1.457+/−2%;
$d_3$ is 1.449+/−2%;
$d_4$ is 1.457+/−2%; and
alpha is 2.08+/−2%.

11. The optical fiber of claim 1 wherein:
$a_1$ is 25 microns+/−2%;
$a_2$ is 25.5+/−2%;
$a_3$ is 36.9+/−2%;
$a_4$ is 62.5+/−2%;
$d_1$ is 1.472+/−2%;
$d_2$ is 1.457+/−2%;
$d_3$ is 1.449+/−2%;
$d_4$ is 1.457+/−2%; and
alpha is 2.08+/−2%.

12. The optical fiber of claim 1 wherein:
$a_1$ is 25 microns+/−2%;
$a_2$ is 29.4+/−2%;
$a_3$ is 40.75+/−2%;
$a_4$ is 62.5+/−2%;
$d_1$ is 1.472+/−2%;
$d_2$ is 1.457+/−2%;
$d_3$ is 1.449+/−2%;
$d_4$ is 1.457+/−2%; and
alpha is 2.08+/−2%.

13. The optical fiber of claim 1 wherein:
$a_1$ is 25 microns+/−2%;
$a_2$ is 27.7+/−2%;
$a_3$ is 39.1+/−2%;
$a_4$ is 62.5+/−2%;
$d_1$ is 1.472+/−2%;
$d_2$ is 1.457+/−2%;
$d_3$ is 1.449+/−2%;
$d_4$ is 1.457+/−2%; and
alpha is 2.08+/−2%.

14. The optical fiber of claim 1 wherein:
$a_1$ is 25 microns+/−2%;
$a_2$ is 30+/−2%;
$a_3$ is 40+/−2%;
$a_4$ is 62.5+/−2%;
$d_1$ is 1.472+/−2%;
$d_2$ is 1.457+/−2%;
$d_3$ is 1.446+/−2%;
$d_4$ is 1.457+/−2%; and
alpha is 2.08+/−2%.

15. The optical fiber of claim 1 wherein:
$a_1$ is 23.5 microns+/−2%;
$a_2$ is 28+/−2%;
$a_3$ is 38.23+/−2%;
$a_4$ is 62.5+/−2%;
$d_1$ is 1.470+/−2%;
$d_2$ is 1.457+/−2%;
$d_3$ is 1.449+/−2%;
$d_4$ is 1.457+/−2%; and
alpha is 2.08+/−2%.

16. The optical fiber of claim 1 wherein:
$a_1$ is 25 microns+/−2%;
$a_2$ is 34+/−2%;
$a_3$ is 37.6+/−2%;
$a_4$ is 62.5+/−2%;
$d_1$ is 1.472+/−2%;
$d_2$ is 1.457+/−2%;
$d_3$ is 1.451+/−2%.

17. The optical fiber of claim 1 wherein a3−a2 is at least 4 microns.

18. An optical fiber link comprising: at least one length of optical fiber comprising a core region with a first radius a1 and a profile alpha, an inner cladding extending radially from a1 to second radius a2, a trench extending radially from second radius a2 to a third radius a3, and an outer cladding extending to a fourth radius a4, wherein a maximum refractive index of the core region is d1, a refractive index of the inner cladding is d2, a refractive index of the trench is d3, and a refractive index of the outer cladding is d4, the first length of optical fiber exhibiting a change in differential mode delay of less than 0.07 picoseconds per meter from an unbent state to bent state, given a reference state of 2 turns around a 10 mm diameter mandrel, and wherein: a1 is 7-50 microns; alpha is 1.6 to 2.2; (a2−a1)/a1 is 0.1 to 0.7; (a3−a2)/a1 is 0.3 to 0.6; a4 is 30-250 microns; d1-d4 is −0.019 to 0.032; d2-d4 is −0.01 to 0.01; d3-d4 is −0.05 to −0.0025; d4 is 1.4 to 1.511; and at least one length of a second multimode optical fiber comprising a core region with a graded index profile alpha connected to said first length of optical fiber.

19. An optical fiber link comprising: a first length of optical fiber further comprising a core region with a first radius a1 and a profile alpha, an inner cladding extending radially from a1 to second radius a2, a trench extending radially from second radius a2 to a third radius a3, and an outer cladding extending to a fourth radius a4, wherein a maximum refractive index of the core region is d1, a refractive index of the inner cladding is d2, a refractive index of the trench is d3, and a refractive index of the outer cladding is d4, the first length of optical fiber exhibiting a change in differential mode delay of less than 0.07 picoseconds per meter from an unbent state to bent state, given a reference state of 2 turns around a 10 mm diameter mandrel, and wherein: a1 is 7-50 microns; alpha is 1.6 to 2.2; (a2−a1)/a1 is 0.1 to 0.7; (a3−a2)/a1 is 0.3 to 0.6; a4 is 30-250 microns; d1-d4 is −0.019 to 0.032; d2-d4 is −0.01 to 0.01; d3-d4 is −0.05 to −0.0025; d4 is 1.4 to 1.511; and a second length standard multimode optical fiber connected to said first length of optical fiber.

* * * * *